US006700291B2

(12) United States Patent
Uchida et al.

(10) Patent No.: US 6,700,291 B2

(45) Date of Patent: Mar. 2, 2004

(54) BRUSH HOLDING DEVICE, MOTOR HAVING THE SAME, AND METHOD FOR ASSEMBLING MOTOR

(75) Inventors: Yasuaki Uchida, Kosai (JP); Masashi Nakata, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 32 days.

(21) Appl. No.: 10/318,064

(22) Filed: Dec. 13, 2002

(65) Prior Publication Data

US 2003/0117036 A1 Jun. 26, 2003

(30) Foreign Application Priority Data

Dec. 26, 2001 (JP) ....................................... 2001-394464

(51) Int. Cl.$^{7}$ ................................................ H02K 39/38

(52) U.S. Cl. ....................... 310/239; 310/242; 310/246; 310/247; 310/248; 29/596

(58) Field of Search ................................ 310/239, 233, 310/238, 240–248; 29/596, 598

(56) References Cited

U.S. PATENT DOCUMENTS 4,324,997 A * 4/1982 Taylor et al. ............... 310/248
4,983,873 A * 1/1991 Tanaka et al. .............. 310/248
5,053,665 A * 10/1991 Yamaguchi et al. ........ 310/239
5,083,055 A * 1/1992 Hokanson ................... 310/248
5,252,878 A * 10/1993 Spellman et al. ........... 310/239
5,280,212 A * 1/1994 Oba ........................... 310/248
5,532,536 A * 7/1996 Gaspar ....................... 310/239
6,225,717 B1 * 5/2001 Burger et al. ................. 310/71
6,326,716 B1 * 12/2001 Niimi et al. ................ 310/239
2002/0047466 A1 4/2002 Mademba-Sy

FOREIGN PATENT DOCUMENTS

JP U-S63-17558 2/1988
JP A-H04-281353 10/1992
JP A-2001-25214 1/2001

OTHER PUBLICATIONS

U.S. patent application Ser. No. 09/948,118, Mademba–Sy, filed Apr. 25, 2002.

* cited by examiner

*Primary Examiner*—Thanh Lam
(74) *Attorney, Agent, or Firm*—Posz & Bethards, PLC

(57) ABSTRACT

Brush holding device includes a brush, a brush holder, a torsion spring and a support pin. The torsion spring applies side pressure to the brush by spring force exerted around the support pin and also temporarily hold the brush in the brush holder. When the temporarily held state of the brush holder is relieved, the spring force of the torsion spring urges the brush toward a commutator.

20 Claims, 9 Drawing Sheets

BRUSH HOLDING DEVICE, MOTOR HAVING THE SAME, AND METHOD FOR ASSEMBLING MOTOR

CROSS REFERENCE TO RELATED APPLICATION

This application is based on and incorporates herein by reference Japanese Patent Application No. 2001-394464 filed on Dec. 26, 2001.

BACKGROUND OF THE INVENTION

1. Field of the Invention

The present invention relates to a method for assembling a motor having an armature, which is rotated through engagement of brushes with a commutator of the armature, and also relates to a brush holding device and a motor having the same.

2. Description of Related Art

In general, a direct current motor includes brushes and a commutator to mechanically commutate externally supplied direct current and to supply it to an armature. Each brush is supported by a corresponding brush holding device. The brush is assembled such that the brush slidably engages the commutator secured to the armature. During manufacturing, each brush holding device is assembled to a housing of the motor before installation of the armature. In the brush holding device, the brush is temporarily held in a retracted position in a brush holder against urging force of a spring before installation of the armature in a housing of the motor. Then, when the armature is installed in a predetermined position in the housing of the motor, the brush is released from the retracted position, so that the temporarily held brush is urged against the commutator to slidably engage the commutator.

As a first example, the following brush holding device has been proposed to achieve the above assembling operation. Each of brushes, which are urged by springs, is engaged with an outer peripheral surface of a ring member and is temporarily held in a retracted position in a brush holder of a corresponding brush holding device. After each brush holding device is assembled to a housing of the motor, the armature is installed to a predetermined position in the housing of the motor. At this time, the ring member is pushed downward by an end surface of the commutator secured to the distal end side of the armature. Thus, each brush, which has been engaged with the outer peripheral surface of the ring member, is now engaged with the commutator instead of engaging with the ring member.

As a second example, the following brush holding device has been proposed to achieve the above assembling operation. A brush holder of each brush holding device, which holds a corresponding brush in a manner that allows protrusion and retraction of the brush relative to the brush holder, is provided with a tongue-shaped hook that extends toward a commutator side. The hook restrains movement of the brush, which is urged toward the commutator side by a spring, to temporarily hold the brush in a retracted position in the brush holder. When the armature is installed in a predetermined position in a housing of the motor, the tongue-shaped hook is bent, so that the temporarily held brush is released. Thus, the brush, which has been restrained to move toward the commutator side (i.e., restrained to protrude from the brush holder) by the hook, now protrudes from the brush holder and engages the commutator.

In the first example, the additional component, i.e., the ring member, is used to temporarily hold the brush at the time of assembly, resulting in an increase in a manufacturing cost. Furthermore, the motor needs to have a space for accommodating the ring member, which is used only for temporarily holding the brushes.

In the second example, similar to the first example, the temporarily held brush in the brush holder is released by the insertion of the armature. Thus, the freedom of the design has been limited in terms of assembling timing of the armature, a positional relationship between each brush and the commutator and the like. Furthermore, when the brushes do not simultaneously engage the commutator, the shaft of the armature can be displaced by the urging force, which radially urges the corresponding brush. Thus, during assembly of the armature, it could disturb the insertion of the shaft distal end of the armature into a corresponding shaft receiving hole. Furthermore, the armature moves continuously after a moment of releasing the temporarily held brushes. In such a case, the released brushes could form an axially extending scratch on a surface of the distal end side of the commutator of the armature. Since the commutator is engaged with the brushes in a circumferential direction during operation of the motor, the axially extending scratch can disturb smooth commutation.

SUMMARY OF THE INVENTION

The present invention addresses the above disadvantage. Thus, it is an objective of the present invention to provide a method for assembling a motor achieving engagement of each brush to a commutator without using insertion movement of an armature. It is another objective of the present invention to provided a brush holding device, which allows engagement of a brush with a commutator without using insertion movement of an armature at assembly of the armature and also allows a reduction in a manufacturing cost of the brush holding device. It is another objective of the present invention to provide a motor having such a brush holding device.

To achieve the objectives of the present invention, there is provided a method for assembling a motor. In the method, a brush is temporarily held in a first position where the brush is retracted away from an installation path of an armature into a brush holder and is urged against a side wall of the brush holder by an urging means in a direction perpendicular to a sliding direction of the brush, which substantially coincides with a radial direction of a commutator of the armature, so that the brush is temporarily held in the first position by a static frictional force generated between the side wall of the brush holder and the brush. This static frictional force is greater than an urging force of the urging means applied to the brush in the sliding direction. Then, the armature, which includes the commutator, is installed in a predetermined position within a housing of the motor along the installation pass of the armature while the brush is temporarily held in the first position. Next, the brush held in the first position is released by applying an external force to the brush in the sliding direction to overcome the static frictional force, so that the brush is slid to a second position, in which the brush is urged against the commutator in the sliding direction, by an urging force of the urging means that is greater than a frictional force between the side wall of the brush holder and the brush.

To achieve the objectives of the present invention, there is also provided a brush holding device for a motor that includes an armature having a commutator. The brush holding device includes a brush, a brush holder and an urging means for urging the brush and also for selectively positioning the brush between a first position and a second position. The brush holder includes a side wall. Furthermore, the brush holder slidably receives the brush such that the brush is slidable in a sliding direction, which substantially coincides with a radial direction of the commutator of the motor. In the first position, the brush is retracted away from the commutator into the brush holder and is urged against the side wall of the brush holder by the urging means in a direction perpendicular to the sliding direction, so that the brush is temporarily held in the first position by a static frictional force generated between the side wall of the brush holder and the brush. This static frictional force is greater than an urging force of the urging means applied to the brush in the sliding direction. In the second position, the brush is urged against the commutator by the urging means in the sliding direction.

To achieve the objective of the present invention, there is also provided a motor including a motor assembly and a speed reducing gear assembly. The motor assembly includes a motor housing, an armature and a rotatable shaft. The motor housing has an open end. The armature is at least partially received in the motor housing and includes a commutator. The rotatable shaft extends along the axis of the armature and is rotated integrally with the armature. The speed reducing gear assembly includes a gear housing, a worm and at least one above described brush holding device. The gear housing has an open end. The worm is received in the gear housing and is integrally formed with the rotatable shaft. Each brush holder is spaced apart from the open end of the gear housing to be completely received within the gear housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention implemented as a motor unit (i.e., a motor or dynamo-electric machine) used in a vehicle wiper system will be described with reference to FIGS. 1 to 8.

Figure 1:
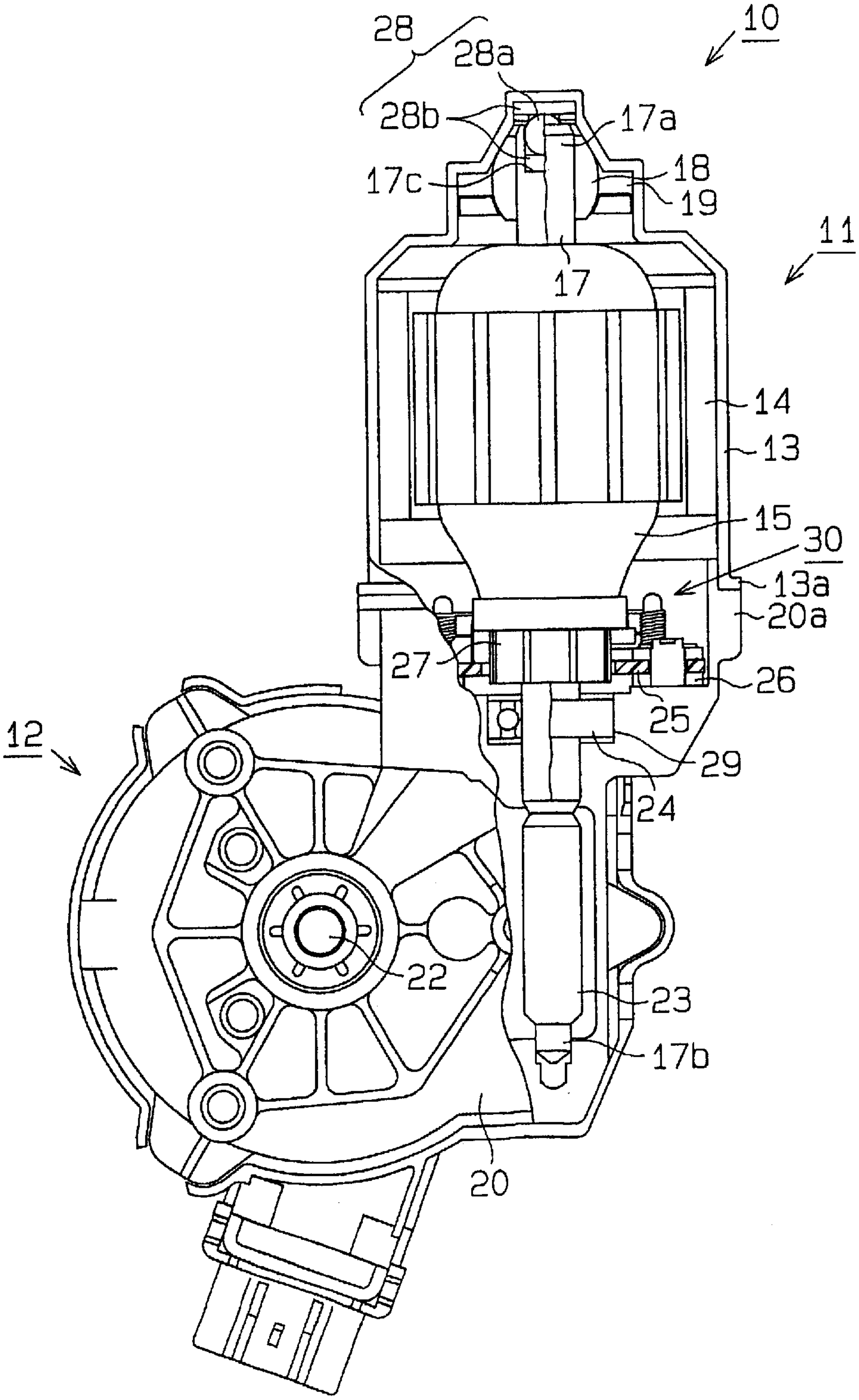
FIG. 1 is a partially cut away view showing a construction of a motor unit according to an embodiment of the present invention.

As shown in FIG. 1, the motor unit 10 includes a motor assembly 11 and a speed reducing gear assembly 12. The motor assembly 11 is a direct current motor and includes a motor housing 13, which constitutes a part of a housing of the motor unit 10. Field magnets 14 and an armature 15 are received in the motor housing 13. The armature 15 is supported by a rotatable shaft 17. A base end 17*a* of the rotatable shaft 17 is rotatably supported by bearings 18, 28, which are secured within the motor housing 13. The bearing 18 serves as a radial bearing, and the bearing 28 serves as a thrust bearing. The bearing 18 is secured to a bearing support 19 arranged at a base end of the motor housing 13. The bearing 28 includes a thrust ball 28*a* and two thrust plates 28*b*. The thrust plates 28*b* rotatably hold the thrust ball 28*a* therebetween. The bearing 28 is received between a recess 17*c*, which is formed in the base end 17*a* of the rotatable shaft 17, and the motor housing 13.

A distal end 17*b* side of the rotatable shaft 17 extends from the motor housing 13 into the speed reducing gear assembly 12. The speed reducing gear assembly 12 includes a gear housing 20, which constitutes a part of the housing of the motor unit 10. Brush holding devices 30 and a worm wheel (not shown) are arranged in the gear housing 20. The gear housing 20 includes an engaging portion (open end) 20*a*. The engaging portion 20*a* is engaged with an engaging portion (open end) 13*a* of the motor housing 13 and is secured to the engaging portion 13*a*, for example, with screws (not shown), so that the gear housing 20 is connected to the motor housing 13.

The worm wheel is rotatably supported in the gear housing 20. One end of the worm wheel is supported by an output shaft 22, which extends outwardly from the gear housing 20. A worm 23 is integrally formed at the distal end 17*b* of the rotatable shaft 17. The worm 23 is meshed with the worm wheel. The worm 23 is rotatably supported by a bearing 24, which serves as a radial bearing. The bearing 24 is secured by a bearing support 29 arranged in the gear housing 20.

A commutator 27 is arranged between the armature 15 and the worm 23. The commutator 27 is shaped as a generally cylindrical body and is rotatably supported to rotate integrally with the rotatable shaft 17. A brush base 25, which includes the brush holding devices 30, is connected to the gear housing 20 through floating rubbers 26 near the commutator 27.

Figure 2:
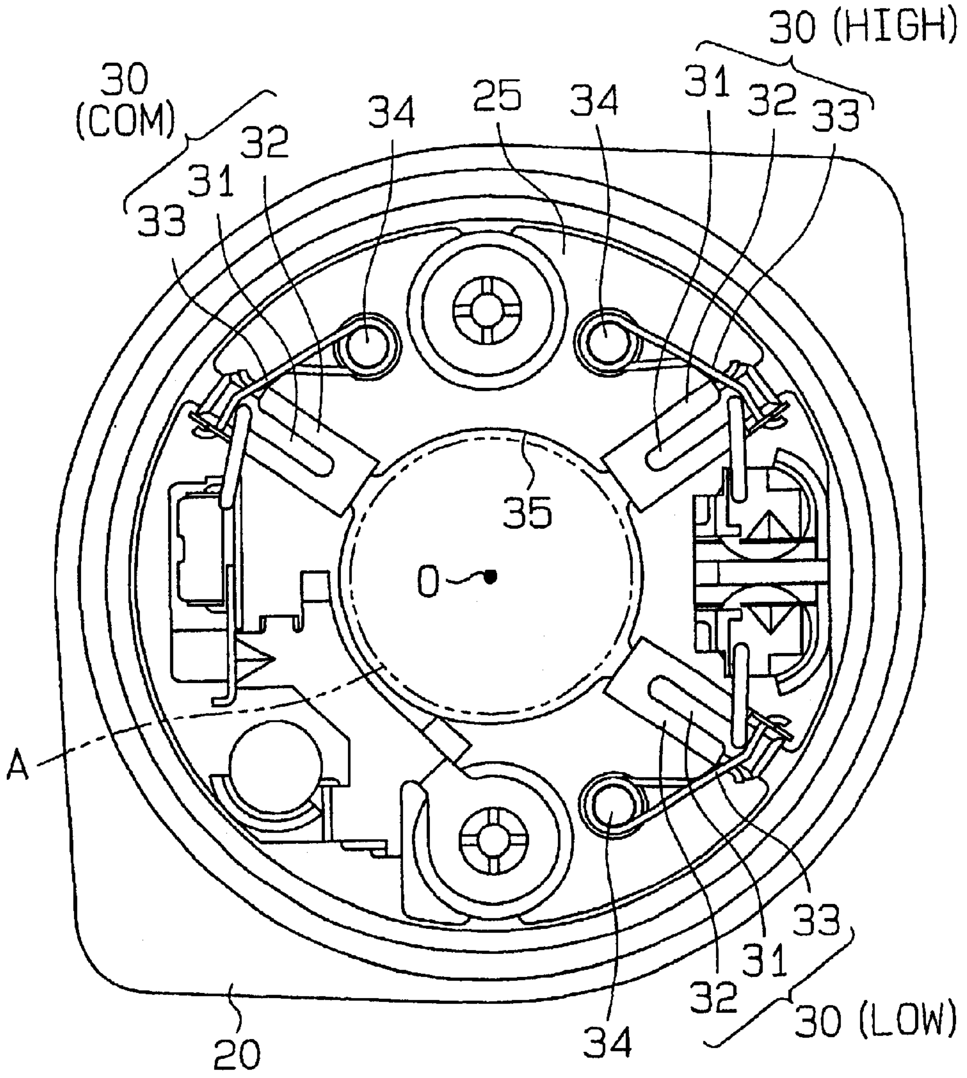
FIG. 2 is a plan view of a speed reducing gear assembly of the motor unit showing a structure on a brush base according to the embodiment.

As shown in FIG. 2, a generally circular through hole (also serving as a part of an installation path of the armature 15 during assembly) 35 extends through the center of the gear housing 20 and the center of the brush base 25. The three brush holding devices 30, which are provided to support a LOW speed brush, a HIGH speed brush and a COM brush (i.e., a common brush), respectively, are directed to the center of the through hole 35 on the brush base 25. The brush base 25 is made of dielectric thermosetting resin, such as phenolic resin. A dot-dot-dash line A shown in FIG. 2 depicts an outer periphery of the commutator 27 connected to the armature 15.

Figure 3:
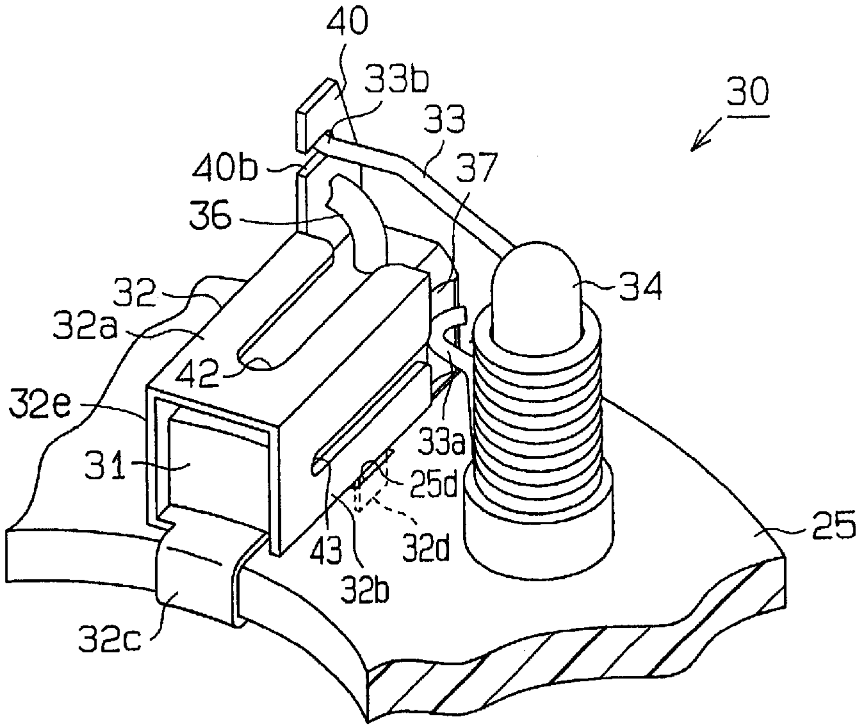
FIG. 3 is a partial enlarged perspective view showing a brush holding device according to the embodiment.

A more specific structure of each brush holding device 30 according to the present embodiment will be described with reference to FIGS. 3–5. As shown in FIG. 3, each brush holding device 30 includes a brush 31, a brush holder 32, a torsion spring (serving as an urging means) 33 and a support pin 34.

The brush holder 32 is made from a metal plate, such as a brass metal plate. A corresponding portion of the metal plate is blanked out from the metal plate using, for example, a press machine and is bent to a generally tubular body. As shown in FIG. 3, a recess 43 is formed in a side wall 32*b* of the brush holder 32. A length of the recess 43 corresponds to a movable range of an engaging projection 33*a* of the torsion spring 33. Another recess 42 is formed in a top wall 32*a* of the brush holder 32. A length of the recess 42 corresponds to a movable range of a pigtail 36. A side plate 40 is provided in the other side wall 32*e,* which is opposed to the above-described side wall 32*b,* such that the side plate 40 projects adjacent to a rear end surface (radially outer end surface) 31*f* side of the brush 31. The side plate 40 has a securing portion 40*b,* to which one end 33*b* of the torsion spring 33 is securely engaged.

The brush holder 32 is secured to the brush base 25 by a pair of securing claws 32*c* and a protrusion 32*d.* The securing claws 32*c* are arranged at opposed open ends, respectively, of the brush holder 32, such that each securing claw 32*c* extends from a corresponding end edge of a wall of the brush holder 32, which contacts the brush base 25. The protrusion 32*d* protrudes from a side edge of the side wall 32*b,* which contacts the brush holder 32. When each securing claw 32*c* is bent and is held against a corresponding peripheral edge of the brush base 25, the brush holder 32 is secured to the brush base 25. When the protrusion 32*d* is inserted into and is engaged with a through hole 25*d,* which extends through the brush base 25, the brush holder 32 made from the single metal plate is secured to the brush base 25, and the tubular body of the brush holder 32 is maintained. The recesses 42, 43, the securing portion 40*b,* the side plate 40, the securing claws 32*c* and the protrusion 32*d* are formed in advance when the corresponding portion is blanked out from the metal plate.

Figure 4A:
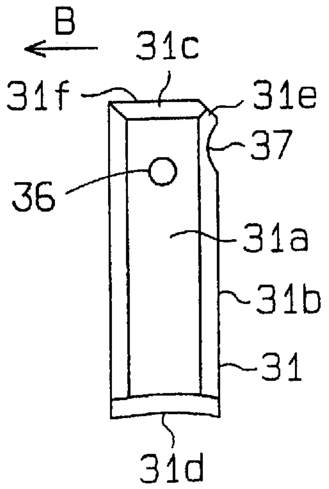
FIG. 4A is a top plan view of a brush according to the embodiment.
Figure 4B:
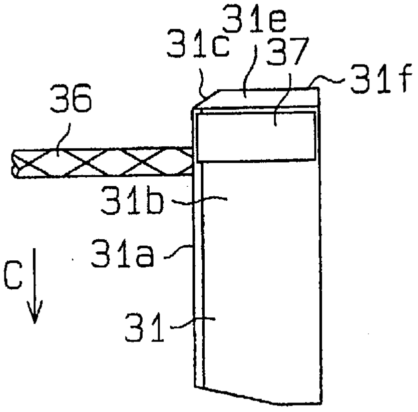
FIG. 4B is a side view of the brush shown in FIG. 4A.

As shown in FIGS. 4A and 4B, each brush 31 is shaped as a generally rectangular parallelopiped. A generally arcuate recess 31*d* is formed in a distal end of the brush 31. The recess 31*d* makes surface contact with a sliding surface of the commutator 27. The pigtail 36 is connected to a top wall 31*a* of the brush 31. An engaging recess 37, which serves as an engaging portion, is formed in a side wall 31*b* of the brush 31. The engaging projection 33*a* of the torsion spring 33 engages the engaging recess 37. The engaging recess 37 of the brush 31 is provided adjacent to a rear end surface 31*f* of the brush 31 and is arcuately recessed in an urging direction (direction of an arrow B in FIG. 4A), in which the brush 31 is urged against the side wall 32*e* of the brush holder 32. A tapered surface 31*c* is arranged adjacent to the rear end surface 31*f* of the brush 31. The tapered surface 31*c* is tapered relative to a sliding direction (direction of an arrow C in FIG. 4B). In the present embodiment, although the tapered surface 31*c* is formed in the rear end surface 31*f* of the brush 31 at the position adjacent to the top wall 31*a,* the tapered surface 31*c* can be alternatively formed at a position adjacent to the side wall 31*b.* Furthermore, as shown in FIGS. 4A and 4B, a chamfered portion 31*e* extends from the engaging recess 37 to the rear end surface 31*f* of the brush 31. The chamfered portion 31*e* allows smooth movement of the engaging projection 33*a* of the torsion spring 33 when the engaging projection 33*a* is disengaged from the engaging recess 37 of the brush 31 and moves toward the rear end surface 31*f* of the brush 31.

Figure 5:
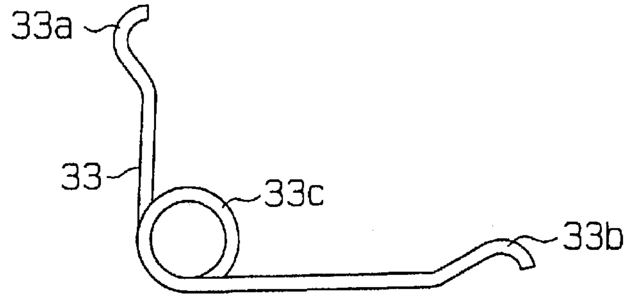
FIG. 5 is a schematic plan view showing a torsion spring of the brush holding device according to the embodiment.

As shown in FIG. 5, the torsion spring 33 has a securing portion 33*b* at one end and the engaging projection 33*a* at the other end. The securing portion 33*b* is secured to the securing portion 40*b* of the brush holder 32. The engaging projection 33*a* engages the engaging recess 37 of the brush 31. The engaging projection 33*a* is generally arcuately curved in an imaginary plane that is substantially perpendicular to the axis of the motor unit 10. Alternatively, the engaging projection 33*a* can be curved in any other appropriate shape. Thus, the engaging projection 33*a* of the torsion spring 33 has a curved engaging surface, and the curved engaging surface of the engaging projection 33*a* substantially coincides with a curved engaging surface of the engaging recess 37 of the brush 31. A coiled supporting portion 33*c* is provided between the securing portion 33*b* and the engaging projection 33*a* of the torsion spring 33. An inner diameter of the supporting portion 33*c* is substantially the same as an outer diameter of the support pin 34.

As shown in FIG. 3, the torsion spring 33 is supported such that the supporting portion 33*c* is received around the support pin 34, which extends from the brush base 25. The securing portion 33*b* of the torsion spring 33 is secured to the securing portion 40*b* of the brush holder 32. The engaging projection 33*a* of the torsion spring 33 engages the engaging recess 37 of the brush 31. As described above, the torsion spring 33 temporarily holds the brush 31 such that the brush 31 is retracted away from the armature 15 into the brush holder 32 by spring force of the torsion spring 33 exerted around the support pin 34.

Figure 6:
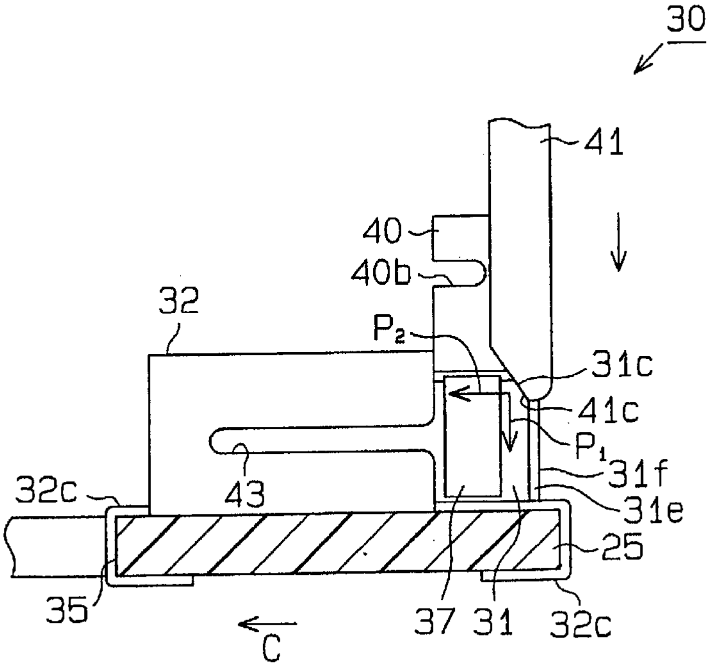
FIG. 6 is a schematic side view depicting a way of releasing the trapped brush according to the present embodiment.

A way of assembling the armature 15 to a main body (housing) of the motor 10 will be described with reference to FIGS. 6–9. As shown in FIG. 6, a jig 41, which urges the rear end surface 31*f* of the brush 31, has a tapered surface 41*c* at a distal end side of the jig 41. The tapered surface 31*c* of the brush 31 is engaged with the tapered surface 41*c* of the jig 41 when the temporarily held brush (or trapped brush) 31 is released. When the jig 41 is urged downward (in a downward direction parallel to the axis of the motor unit 10), the urging force of the jig 41 is divided into force components P1, P2 at the rear end surface 31*f* of the brush 31. The force component P1 presses the brush base 25. The force component P2 urges the brush 31 in the sliding direction toward the commutator 27.

Figure 8:
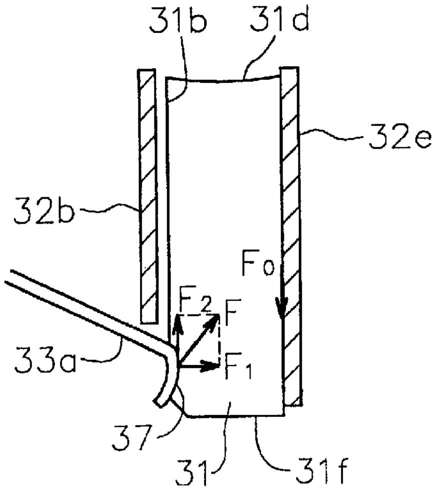
FIG. 8 is a schematic view showing forces present in the state shown in FIG. 7A.
Figure 7A:
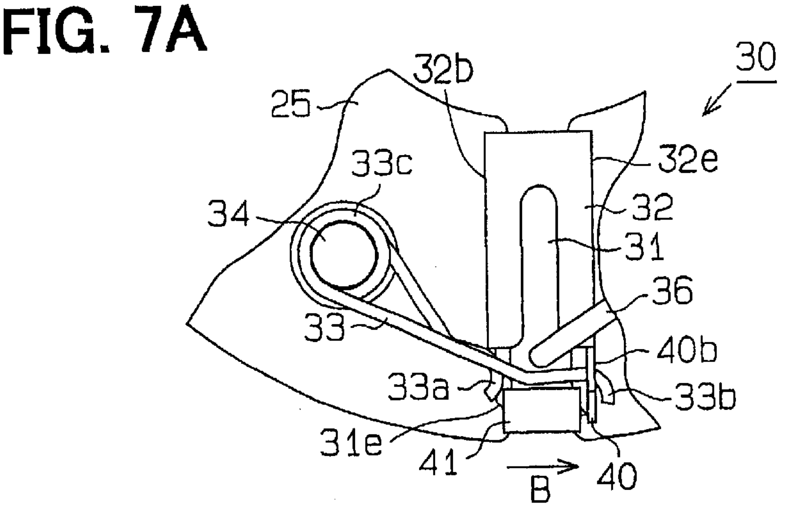
FIG. 7A is a schematic view showing a state before release of the trapped brush.

FIG. 7A shows the brush 31 that is temporarily held or trapped in the brush holder 32. In this state, the engaging projection 33*a* of the torsion spring 33 is engaged with the engaging recess 37 of the brush 31. The engaging projection 33*a* of the torsion spring 33 and the engaging recess 37 of the brush 31 are engaged together at an engaging point, which is located radially outward of the central axis of the support pin 34. Thus, the torsion spring 33 applies side pressure against the brush 31 in a direction (direction of an arrow B in FIG. 7A) perpendicular to the sliding direction of the brush 31. As a result, the brush 31 is urged against the side wall 32*e* of the brush holder 32 and is temporarily held such that the brush 31 is retracted away from an installation path of the armature 15 into the brush holder 32 in a retracted position (first position) In this state, as shown in FIG. 8, the force F applied from the engaging projection 33*a* of the torsion spring 33 to the engaging recess 37 of the brush 31 is divided into a first force component F1 and a second force component F2. The first force component F1 is applied in the direction (indicated by the arrow B in FIG. 7A) perpendicular to the sliding direction from the engaging projection 33*a* of the torsion spring 33 to the engaging recess 37 to generate the side pressure, and the second force component F2 is applied in the sliding direction toward the commutator 27. At this time, a static frictional force F0 greater than the second force component F2 is generated between the side wall 32*e* of the brush holder 32 and the brush 31, so that brush 31 is held in the retracted position.

Figure 9:
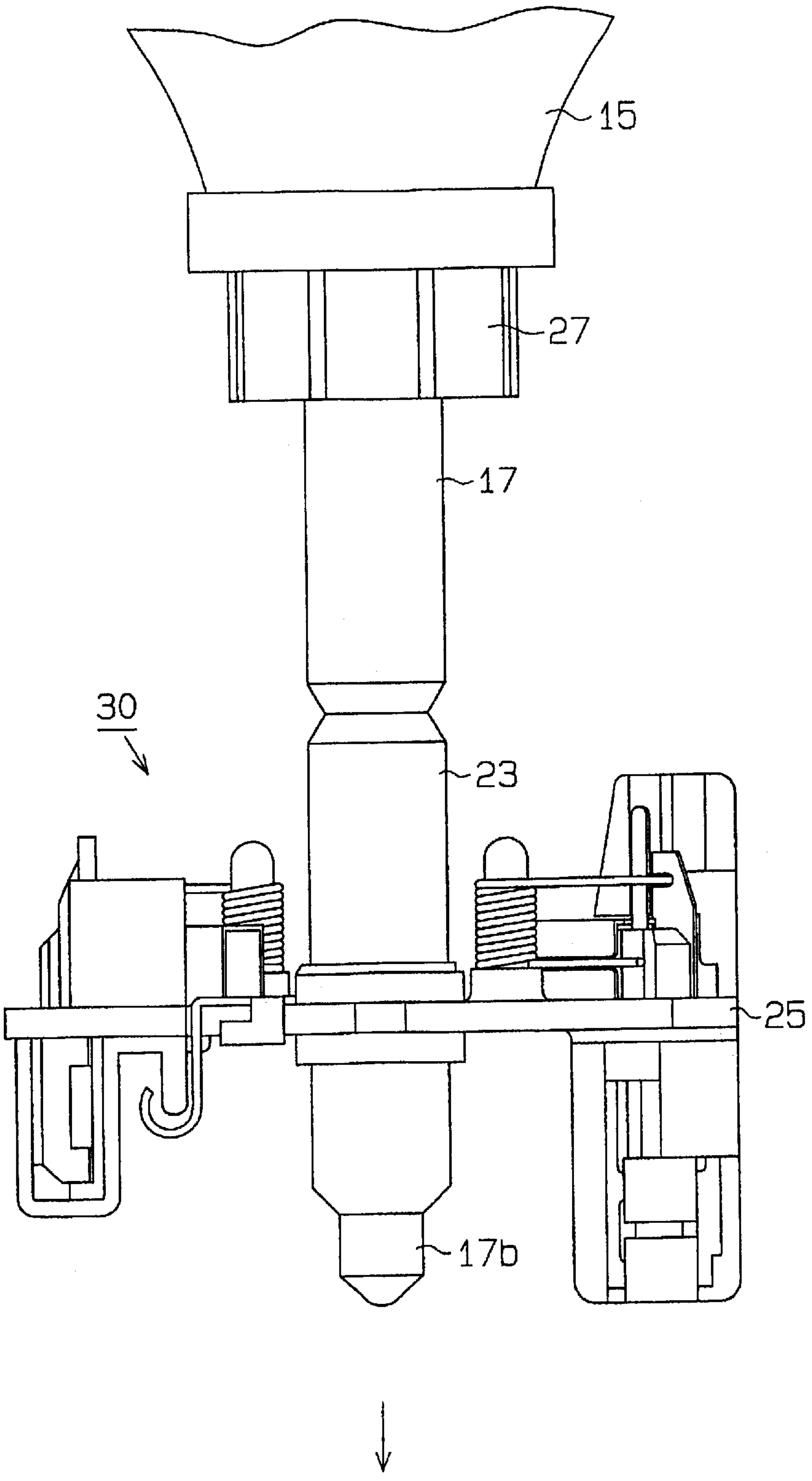
FIG. 9 is a schematic view showing installation movement of an armature of the motor unit along its installation path according to the present embodiment.

Next, as shown in FIG. 9, the armature 15 is installed along the installation path in a direction indicated by an arrow in FIG. 9 such that the armature 15 is received in the through hole 35, which is formed through the center of the gear housing 20 and the center of the brush base 25. In this case, the distal end 17*b* of the rotatable shaft 17 is inserted in the through hole 35 from the top side of the through hole 35. When the sliding surface of the commutator 27 reaches the brush holding devices 30 on the brush base 25, the insertion movement of the armature 15 is stopped. After the armature 15 is properly installed, the trapped brush 31 of each brush holding device 30 is released from the retracted position.

Figure 7B:
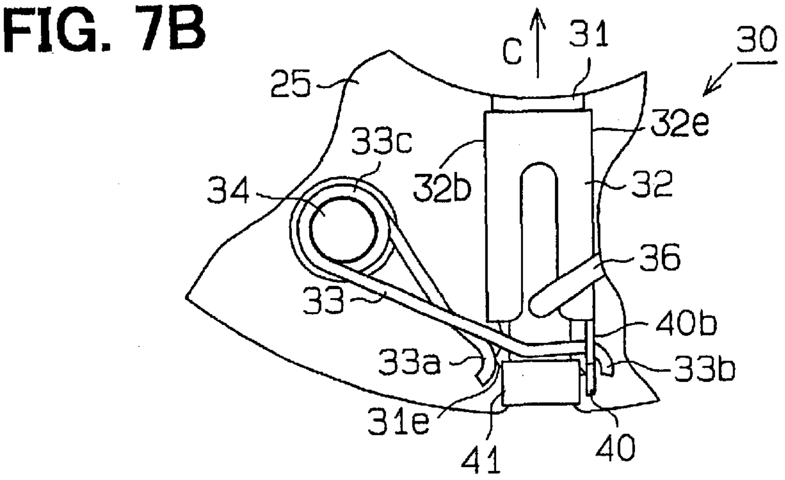
FIG. 7B is a schematic view similar to FIG. 7A showing a state during the release of the trapped brush.

FIG. 7B shows a state where the trapped brush 31 is released partway. When the jig 41 is engaged with the tapered surface 31*c* of the rear end surface 31*f* of the brush 31, and the jig 41 is urged downward, the brush 31 slightly moves in the urging direction (direction of an arrow C in FIG. 7B), in which the brush 31 is urged against the commutator 27. Since the securing portion 33*b* of the torsion spring 33 is secured to the securing portion 40*b* of the brush holder 32, this will cause the engaging projection 33*a,* which is located at the other end of the torsion spring 33, to be released from the engaging recess 37. In this way, after the trapped brush 31 is released, the engaging projection 33*a* and the engaging recess 37 move relative to each other. Then, the engaging projection 33*a* reaches the rear end surface 31*f* of the brush 31.

Figure 7C:
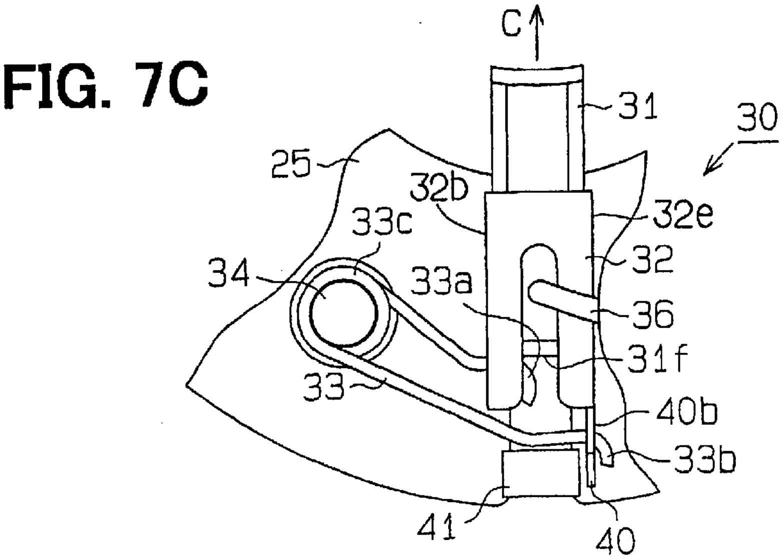
FIG. 7C is a schematic view similar to FIGS. 7A and 7B showing a state after the release of the trapped brush.

FIG. 7C shows a state after the engaging projection 33*a* reaches the rear end surface 31*f* of the brush 31. The torsion spring 33 applies the urging force, which has been applied to the brush 31 as the side pressure, to the brush 31 as the urging force for urging the brush 31 toward the commutator 27. Then, the brush 31, which is urged by the torsion spring 33, protrudes from the brush holder 32. Thereafter, the distal end of the brush 31 is engaged with the sliding surface of the commutator 27 in a protruded position (second position). In this way, the brush 31 is engaged with the sliding surface of the commutator 27 without using the insertion movement of the armature 15 at the assembly of the armature 15.

The above embodiment provides the following advantages.

(1) The brush 31 is released from the temporarily held state in the brush holder 32 without using the insertion movement of the armature 15 at the assembly of the armature 15. In this case, the brush 31 is engaged with the commutator 27 after the armature 15 is properly assembled. Thus, each brush holding device 30 is free of design limitations with respect to the assembling timing of the armature 15. As a result, the design of each brush holding device 30 is eased.

(2) Each brush holding device 30 uses the torsion spring 33, which is initially provided to urge the brush 31 toward the commutator 27. In this case, the torsion spring 33 temporarily holds the brush 31 in the brush holder 32 through engagement between the engaging projection 33*a* of the torsion spring 33 and the engaging recess 37 of the brush 31 while applying the side pressure to the brush 31. Thus, there is no need to provide a new component that temporarily holds the brush 31. As a result, the brush holding devices 30 can be manufactured at a reduced cost.

(3) The engaging recess 37 of the brush 31 is the curved recess that is recessed in the urging direction, in which the brush 31 is urged against the side wall 32*e* of the brush holder 32. Also, the engaging projection 33*a* of the torsion spring 33 is curved to correspond with the shape of the engaging recess 37. Thus, during release of the trapped brush 31, the engaging projection 33*a* can be quickly, reliably released from the engaging recess 37. As a result, the brush 31 in the temporarily held state in the brush holder 32 can be quickly, reliably released.

(4) The tapered surface 31*c*, which is tapered in the sliding direction, is formed in the rear end surface 31*f* of the brush 31. In this case, when the jig 41 is engaged with the rear end surface 31*f* of the brush 31, and force is applied to the jig 41, the force component P2 can be generated in the sliding direction (direction of an arrow C in FIG. 6) at the rear end surface 31*f* of the brush 31. Thus, the brush 31 can be reliably moved in the sliding direction by the force component (external force) P2. Furthermore, even though the housing is arranged adjacent to the rear end side of the brush 31, and thus the brush 31 cannot be directly urged in the sliding direction, the brush 31 can be released from the temporarily held state in the brush holder 32.

(5) The torsion spring 33 is supported by the support pin 34, which extends at the position adjacent to the brush holder 32 on the brush base 25. Thus, the torsion spring 33 can reliably apply the side pressure to the brush 31 by the spring force exerted around the support pin 34. Furthermore, after the engaging projection 33*a* of the torsion spring 33 is released from the engaging recess 37 of the brush 31, the engaging projection 33*a* of the torsion spring 33 moves to the rear end surface 31*f* of the brush 31. Thus, the torsion spring 33 can apply the side pressure to the brush 31 and can also urge the brush 31 toward the commutator 27.

(6) The engaging point of the torsion spring 33 and the brush 31 is located radially outward of the central axis of the support pin 34. Thus, while the brush 31 is temporarily held in the brush holder 32, the spring force of the torsion spring 33 is divided into the side pressure for urging the brush 31 against the side inner wall of the brush holder 32 and the urging force for urging the brush 31 toward the commutator 27. As a result, when the side pressure applied to the brush 31 from the torsion spring 33 is relieved, the torsion spring 33 can reliably urges the brush 31 toward the commutator 27.

(7) The engaging recess 37 of the brush 31 is formed adjacent to the rear end (radially outer end) of the brush 31.

Thus, the engaging projection 33*a* of the torsion spring 33 can be quickly moved to the rear end surface 31*f* of the brush 31 when the trapped brush 31 is released. As a result, the spring force of the torsion spring 33 can immediately urge the brush 31 toward the commutator 27 when the side pressure applied from the torsion spring 33 to the brush 31 is relieved.

(8) The brush holder 32 is secured to the brush base 25 by the securing claws 32*c* and the protrusion 32*d*. In this case, in the brush holder 32, which is made from the single metal plate, the protrusion 32*d* is inserted in the through hole 25*d* of the brush base 25, so that a space between the side wall 32*b* and the wall, which contacts the brush base 25, is not increased. As a result, the brush holder 32, which is shaped as the tubular body, is not easily deformed. In this way, the brush holder 32 can maintain the predetermined tubular shape even when the thickness of the metal plate is reduced. The brush 31 can be held while jittering of the brush 31 is restrained. Furthermore, the manufacturing cost of the brush retaining devices 30 can be reduced.

The above embodiment can be modified as follows.

Figure 10A:
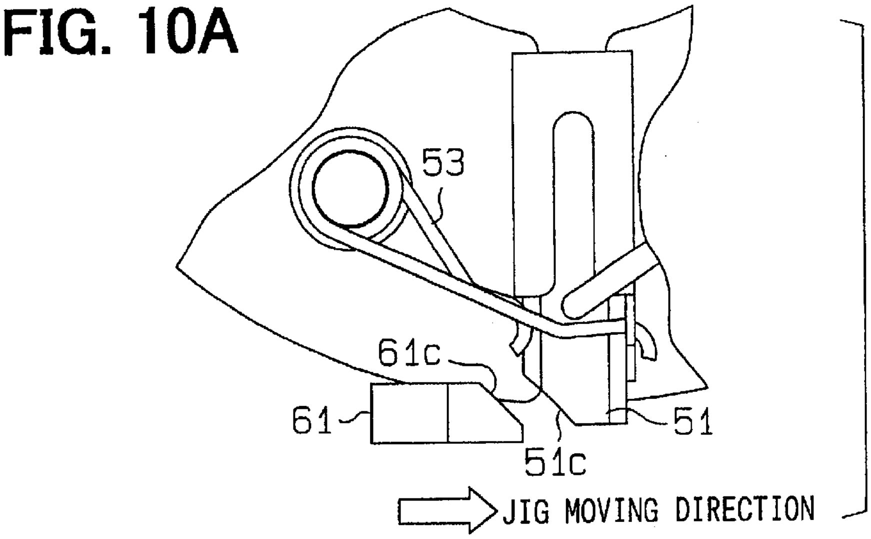
FIG. 10A is a schematic partial top plan view showing a modification of the embodiment.
Figure 10B:
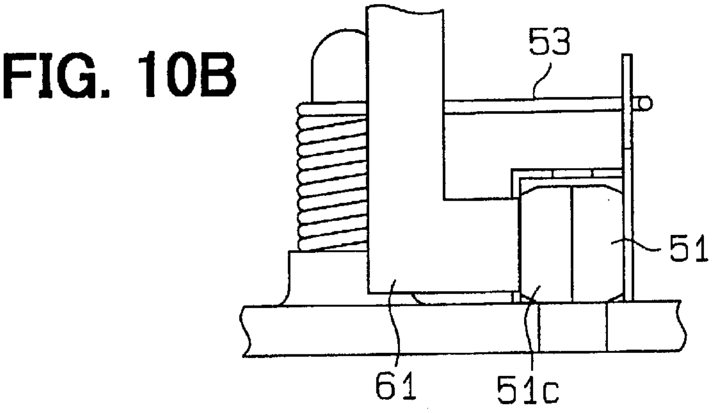
FIG. 10B is a schematic side view of FIG. 10A.
Figure 11A:
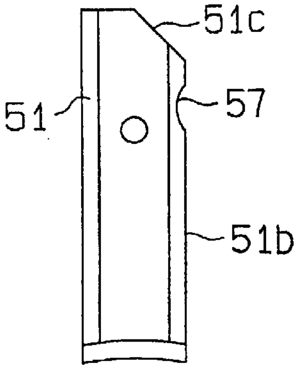
FIG. 11A is a top plan view of a brush shown in FIGS. 10A and 10B.
Figure 11B:
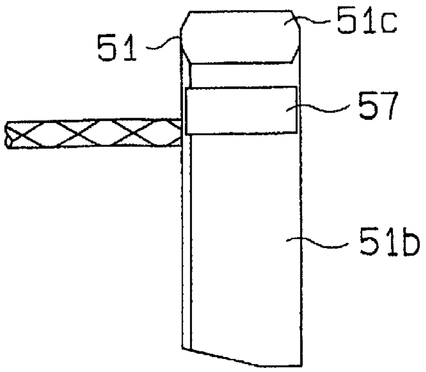
FIG. 11B is a side view of the brush shown in FIG. 11A.

In the above embodiment, the tapered surface 31*c*, which is tapered in the sliding direction, is formed in the rear end surface 31*f* of the brush 31. When the jig 41 is engaged with the tapered surface 31*c* and is urged downward, the temporarily held state of the brush 31 is relieved. Alternatively, as shown in FIGS. 11A and 11B, a tapered surface 51*c* can be formed in a side surface of a brush 51. In this case, as shown in FIGS. 10A and 10B, a jig 61 is engaged with the tapered surface 51*c* and is urged in a rotational direction, so that a temporarily held state of the brush 51 (i.e., engagement between an engaging recess 57 formed in a side wall 51*b* of the brush 51 and the engaging projection 33*a* of the spring 33) is relieved.

Figure 12A:
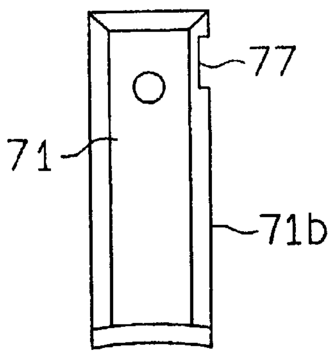
FIG. 12A is a top plan view showing a modification of the brush.
Figure 12B:
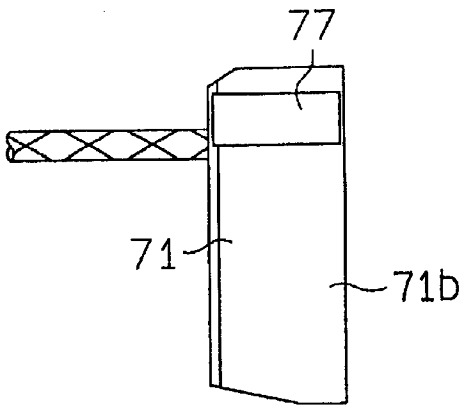
FIG. 12B is a side view of the brush shown in FIG. 12A.
Figure 13A:
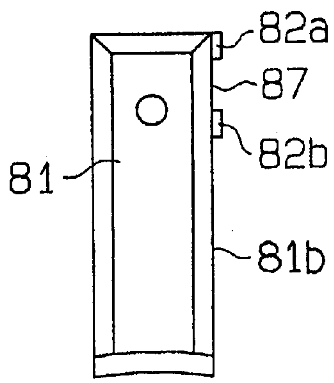
FIG. 13A is a top plan view showing another modification of the brush.
Figure 13B:
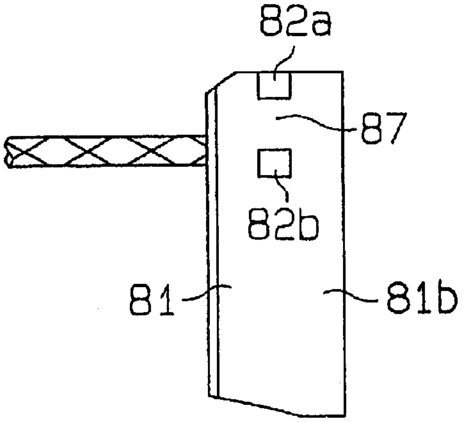
FIG. 13B is a side view of the brush shown in FIG. 13A.

In the above embodiment, the engaging recess 37 of the brush 31 is shaped as the curved recess. Alternative to the curved engaging recess 37, as shown in FIGS. 12A and 12B, an engaging recess 77 of a brush 71 formed in a side wall 71*b* can be shaped as a rectangular recess. Further alternative to the curved engaging recess 37, as shown in FIGS. 13A and 13B, two protrusions 82*a*, 82*b* can be formed in a side wall 81*b* of a brush 81, and an engaging recess 87 can be formed between the protrusions 82*a*, 82*b*.

In the above embodiment, the rear end surface 31*f* of the brush 31, to which the jig 41 is engaged, is arranged radially inward of the outer peripheral edge of the brush base 25. The rear end surface 31*f* of the brush 31 can be arranged radially outward of the outer peripheral edge of the brush base 25.

Figure 14:
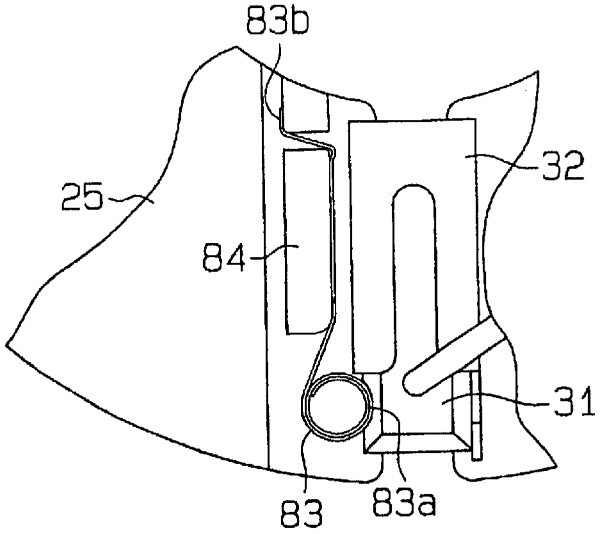
FIG. 14 is a partial plan view showing another modification of the embodiment.
Figure 15:
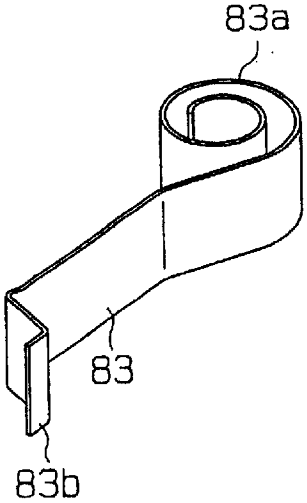
FIG. 15 is an enlarged perspective view of a brush spring shown in FIG. 14.

In the above embodiment, the torsion spring 33, which serves as the urging means, is shaped as the coil spring. Alternatively, as shown in FIGS. 14 and 15, a torsion spring 83 can be made of a constant pressure spiral spring. The torsion spring 83 has an engaging projection 83*a* at one end and a securing portion 83*b* at the other end. In this case, the engaging projection 83*a* is formed by winding one end of the constant pressure spring in a thickness direction.

In the above embodiment, the metal brush holder 32 and the resin brush base 25 are made separately from each other. Alternatively, the brush holder 32 and the brush base 25 can be integrally made form a dielectric resin material. In this case, the number of components and the number of assembling steps of the brush holding devices 30 can be reduced. Thus, the brush holding devices 30 can be manufactured at reduced costs.

Figure 16:
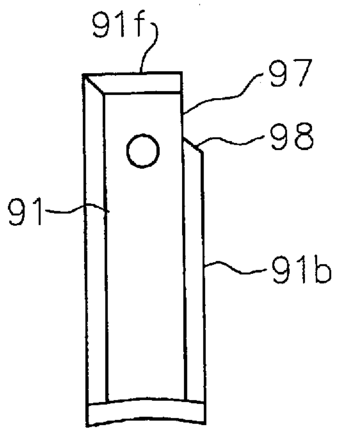
FIG. 16 is a top plan view showing another modification of the brush.

Furthermore, as shown in FIG. 16, the brush 31 can be replaced with a brush 91 shown in FIG. 16. An engaging portion 97 of the brush 91, which engages the engaging projection 33*a* of the torsion spring 33 is formed as a stepped portion that is stepped into a side wall 91*b* of the brush 91, which faces the urging means 33, and the stepped portion 97 extends to a rear end surface (radially outer end surface) 91*f* of the brush 91 and is generally parallel to a longitudinal axis of the brush 91. In this case, unlike the engaging recess 37 of the brush 31, the stepped portion 97 of the brush 91 does not have a resisting projection that resists movement of the engaging projection 33*a* of the torsion spring 33 to the rear end surface 31*f* when the brush 31 held in the retracted position is forced to slide in the sliding direction toward the commutator 27, so that the brush 91 can be more easily released from the retracted position in comparison to the brush 31. Furthermore, similar to the engaging recess 31*e* of the brush 31, the stepped portion 97 allows easy positioning of the brush 91 relative to the engaging projection 33*a* of the torsion spring 33. That is, when the brush 91 is installed in the brush holder 32, the brush 91 is inserted into the brush holder 32 from the radially outer end of the brush holder 32, and then the brush 91 is slightly retuned toward the radially outer end of the brush holder 32 to engage a wall 98 of the brush 91, which is provided at a radially inner end of the stepped portion 97, with the engaging projection 33*a* of the torsion spring 33. With this engagement, an operator can notice that the brush 91 is appropriately position relative to the engaging projection 33*a* of the torsion spring 33. It should be noted although the wall 98 is slanted relative to the engaging portion 97, the wall 98 can extend perpendicular to the engaging portion 97.

Figure 17:
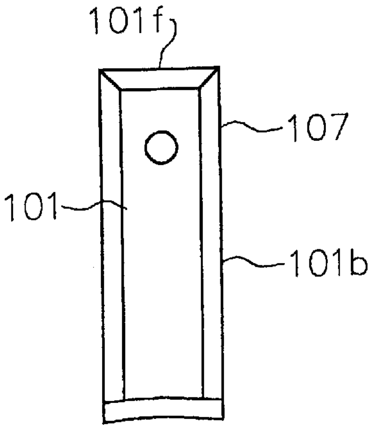
FIG. 17 is a top plan view showing a further modification of the brush.

With reference to FIG. 17, the brush 31 can be replaced with a brush 101. In this case, an engaging portion 107 of the brush 101 is formed in a side wall 101*b* near a rear end surface (radially outer end surface) 101*f* of the brush 101 and is flush with the rest of the side wall 101*b* of the brush 31. Even with this arrangement, the brush 101 can be appropriately held in the retracted position upon engagement with the engaging projection 33*a* of the torsion spring 33. However, it should be noted that the brush 91 is preferred over the brush 101 due to the following reason. That is, the engaging point between the stepped portion 97 of the brush 91 and the engaging projection 33*a* of the torsion spring 33 is located away from the engaging point between the engaging portion 107 of the brush 101 and the engaging projection 33*a* of the torsion spring 33 in a return direction (urging direction) of the engaging projection 33*a* of the torsion spring 33. Thus, a first force component (similar to the first force component F1 shown in FIG. 8) of the force applied from the engaging projection 33*a* of the torsion spring 33 to the stepped portion 97 of the brush 91 in the direction perpendicular to the sliding direction is smaller than that of the engaging portion 107 of the brush 101. As a result, the static frictional force generated between the side wall 32*e* of the brush holder 32 and the brush 91 is reduced in comparison to the static frictional force generated between the side wall 32*e* of the brush holder 32 and the brush 101, so that the brush 91 can be more easily released from the retracted position in comparison to the brush 101.

Additional advantages and modifications will readily occur to those skilled in the art. The invention in its broader terms is therefore, not limited to the specific details, representative apparatus, and illustrative examples shown and described.

What is claimed is:

1. A method for assembling a motor, the method comprising:

temporarily holding a brush in a first position where the brush is retracted away from an installation path of an armature into a brush holder and is urged against a side wall of the brush holder by an urging means in a direction perpendicular to a sliding direction of the brush, which substantially coincides with a radial direction of a commutator of the armature, so that the brush is temporarily held in the first position by a static frictional force generated between the side wall of the brush holder and the brush, wherein the static frictional force is greater than an urging force of the urging means applied to the brush in the sliding direction;

installing the armature, which includes the commutator, in a predetermined position within a housing of the motor along the installation pass of the armature while the brush is temporarily held in the first position; and releasing the brush held in the first position by applying an external force to the brush in the sliding direction to overcome the static frictional force, so that the brush is slid to a second position, in which the brush is urged against the commutator in the sliding direction, by an urging force of the urging means that is greater than a frictional force between the side wall of the brush holder and the brush.

2. A method according to claim 1, wherein the releasing of the brush held in the first position includes moving a jig, which has a tapered surface, in a direction parallel to the axis of the motor to apply to external force to the brush, so that the tapered surface of the jig pushes a tapered surface of a radially outer end of the brush in the sliding direction toward the second position.

3. A method according to claim 1, wherein the temporarily holding of the brush in the first position includes engaging a curved engaging portion of the urging means to an engaging portion of the brush, wherein the curved engaging portion of the urging means is curved in an imaginary plane that is substantially perpendicular to the axis of the motor.

4. A method according to claim 3, wherein the curved engaging portion of the urging means and the engaging portion of the brush are engaged together at an engaging point located radially outward of the central axis of a support pin, which supports the urging means.

5. A brush holding device for a motor that includes an armature having a commutator, the brush holding device comprising:

a brush;

a brush holder that includes a side wall, wherein the brush holder slidably receives the brush such that the brush is slidable in a sliding direction, which substantially coincides with a radial direction of the commutator of the motor; and an urging means for urging the brush and also for selectively positioning the brush between:

a first position where the brush is retracted away from the commutator into the brush holder and is urged against the side wall of the brush holder by the urging means in a direction perpendicular to the sliding direction, so that the brush is temporarily held in the first position by a static frictional force generated between the side wall of the brush holder and the brush, wherein the static frictional force is greater than an urging force of the urging means applied to the brush in the sliding direction; and a second position where the brush is urged against the commutator by the urging means in the sliding direction.

6. A brush holding device according to claim 5, wherein the urging means releases the brush held in the first position when an external force is applied to the brush in the sliding direction to overcome the static frictional force, so that the brush is slid to the second position by an urging force of the urging means, which is greater than a frictional force between the side wall of the brush holder and the brush.

7. A brush holding device according to claim 6, wherein the brush includes an engaging portion, which engages the urging means in the first position.

8. A brush holding device according to claim 7, wherein:

the urging means includes an engaging portion, which engages the engaging portion of the brush in the first position; and the engaging portion of the urging means urges the brush in the sliding direction toward the second position upon release of the engagement between the engaging portion of the brush and the engaging portion of the urging means by the external force.

9. A brush holding device according to claim 8, wherein the engaging portion of the urging means is curved in an imaginary plane that is substantially perpendicular to the axis of the motor.

10. A brush holding device according to claim 9, wherein the engaging portion of the urging means is generally arcuately curved.

11. A brush holding device according claim 8, wherein the engaging portion of the brush is a recess that is recessed in a side wall of the brush, which faces the urging means, in the direction perpendicular to the sliding direction of the brush.

12. A brush holding device according to claim 11, wherein:

the engaging portion of the brush has a curved engaging surface; and the engaging portion of the urging means has a curved engaging surface, which substantially coincides with the curved engaging surface of the engaging portion of the brush and is engaged with the curved engaging surface of the engaging portion of the brush.

13. A brush holding device according to claim 8, wherein the engaging portion of the brush is a stepped portion that is stepped into a side wall of the brush, which faces the urging means, and at least a portion of the stepped portion extends to a radially outer end surface of the brush and is generally parallel to a longitudinal axis of the brush.

14. A brush holding device according to claim 8, wherein the brush has a radially outer end, which includes a tapered surface tapered in the sliding direction of the brush.

15. A brush holding device according to claim 8, further includes a brush base that supports the brush, the brush holder and the urging means.

16. A brush holding device according to claim 15, wherein the brush base and the brush holder are integrally molded from a dielectric resin material.

17. A brush holding device according to claim 15, wherein:

the brush base includes a support pin, which is arranged adjacent to the brush holder to support the urging means; and the urging means is a torsion spring that includes:

a securing portion that is formed at one end of the torsion spring and is secured to the brush holder;

the engaging portion that is formed at the other end of the torsion spring and engages the engaging portion of the brush; and a supporting portion that is formed at an intermediate section of the torsion spring between the securing portion and the engaging portion and is coiled to receive the support pin.

18. A brush holding device according to claim 17, wherein the engaging portion of the torsion spring and the engaging portion of the brush are engaged together at an engaging point located radially outward of the central axis of the support pin.

19. A brush holding device according to claim 7, wherein the engaging portion of the brush is arranged adjacent to a radially outer end surface of the brush.

20. A motor comprising:

a motor assembly that includes:
- a motor housing that has an open end;
- an armature that is at least partially received in the motor housing and includes a commutator; and
- a rotatable shaft that extends along the axis of the armature and is rotated integrally with the armature; and a speed reducing gear assembly that includes:
- a gear housing that has an open end;
- a worm that is received in the gear housing and is integrally formed with the rotatable shaft; and at least one brush holding device arranged around the commutator, wherein each brush holding device includes:
- a brush;

a brush holder that is spaced apart from the open end of the gear housing to be completely received within the gear housing and includes a side wall, wherein the brush holder slidably receives the brush such that the brush is slidable in a sliding direction, which substantially coincides with a radial direction of the commutator of the motor; and an urging means for urging the brush and also for selectively positioning the brush between:
- a first position where the brush is retracted away from the commutator into the brush holder and is urged against the side wall of the brush holder by the urging means in a direction perpendicular to the sliding direction, so that the brush is temporarily held in the first position by a static frictional force generated between the side wall of the brush holder and the brush, wherein the static frictional force is greater than an urging force of the urging means applied to the brush in the sliding direction; and
- a second position where the brush is urged against the commutator by the urging means in the sliding direction.

* * * * *